(12) United States Patent
Adusumilli

(10) Patent No.: US 10,200,733 B1
(45) Date of Patent: Feb. 5, 2019

(54) AUTOMATIC INPUT SELECTION

(71) Applicant: Krishna Adusumilli, Mequon, WI (US)

(72) Inventor: Krishna Adusumilli, Mequon, WI (US)

( * ) Notice: Subject to any disclaimer, the term of this patent is extended or adjusted under 35 U.S.C. 154(b) by 0 days.

(21) Appl. No.: 15/916,554

(22) Filed: Mar. 9, 2018

(51) Int. Cl.
  *H04N 21/41* (2011.01)
  *H04N 21/422* (2011.01)
  *H04N 21/45* (2011.01)

(52) U.S. Cl.
  CPC ... *H04N 21/4104* (2013.01); *H04N 21/42204* (2013.01); *H04N 21/45* (2013.01)

(58) Field of Classification Search
  CPC ......... H04N 21/4104; H04N 21/42204; H04N 21/45
  See application file for complete search history.

(56) References Cited

U.S. PATENT DOCUMENTS

| | | | | |
|---|---|---|---|---|
| 8,880,918 | B2* | 11/2014 | Hwang | H04L 12/12 713/310 |
| 2006/0080707 | A1* | 4/2006 | Laksono | H04L 12/2805 725/38 |
| 2013/0290551 | A1* | 10/2013 | Yang | H04L 12/2803 709/228 |
| 2014/0223463 | A1* | 8/2014 | Hatambeiki | H04N 21/44204 725/12 |

* cited by examiner

*Primary Examiner* — Oschta I Montoya

(57) ABSTRACT

Disclosed are techniques for minimizing user effort when controlling complex media systems such as home theater systems. When multiple devices are connected within such systems, it is necessary to ensure that content from the intended device is presented. In accordance with the disclosed principles, source selection is automatically performed by analyzing command signals and cross-referencing these signals with those expected for devices known to be within the system.

17 Claims, 8 Drawing Sheets

| Device Type 510 | Device Manufacturer 520 | Device Model Identifier 530 | Command Signals 540 |
|---|---|---|---|
| Blu-ray Player | Sooni | 123-456-78900 | - Play<br>- Device On<br>- Playback Speed Controls |
| Blu-ray Player | Panaoptic | 934-354-23912 | - Play<br>- Device On<br>- Playback Speed Controls<br>- "Home Screen" Button<br>- "Enter" Button |
| Music Player | Vinyl Digital | 239-231-59232 | - Play<br>- Device On<br>- Song Selection |
| Media Center Computer | Orange | 521-923-42112 | - Play<br>- Device On<br>- Song Selection |
| Game Console | Macrosoft | 705-292-54620 | - Device On<br>- "Start" Button<br>- "Select" Button |
| Game Console | Mimtambo | 021-429-7602 | - Device On |
| Game Console | Sooni | 456-321-2021 | - Device On<br>- "A" Button |
| Cable Box | Tim Werner Company | 789-312-0093 | - Device On<br>- Channel Selection Controls |
| All-In-One Dongle | Goggles | 046-957-8203 | - Device On |

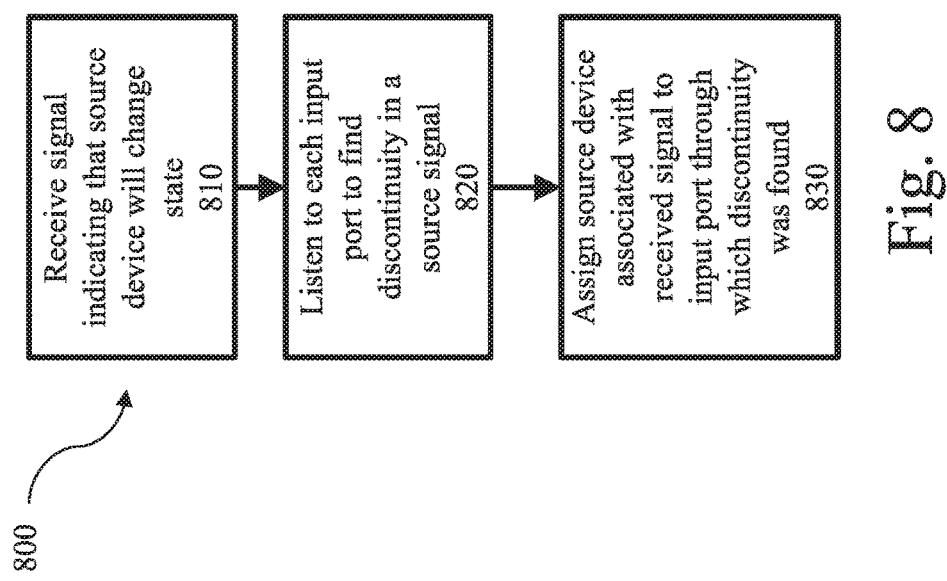

AUTOMATIC INPUT SELECTION

BACKGROUND

1. Technical Field

The field of the present disclosure is the control of media systems, and more specifically the selection of media content for presentation.

2. Related Art

As the consumer electronics marketplace continues to expand, the complexity of home entertainment systems has vastly increased. Some device manufacturers have released "all-in-one" devices that can provide content from disk-based media, internet radio, and even social media to an output device (e.g., a television screen or projector) within a home entertainment system. However, many individuals nonetheless choose to incorporate multiple input devices within their home entertainment systems.

With the ability to control numerous devices, universal remotes have emerged as a partial solution to device proliferation. However, even universal remotes have certain disadvantages often driven by their requirements to recreate all of the features provided by multiple remote controls. At times, the user experience is not simplified but instead complicated by each of the user selections necessary for a universal remote to provide its requisite functions. As a result, many individuals continue to use discrete remote controls for each of the multiple devices within their home systems.

SUMMARY

Enclosed is a detailed description of devices, systems, and methods for selecting input sources in television, home theater, and other audio- and video-based media systems. In some embodiments, an input selection device may be deployed as an intermediary between one or more source devices and one or more output devices. The input selection device may comprise a receiver for detecting command signals (e.g., sent from various remote controls and intended to control the source devices), memory for storing the basic topology of the system in which the input selection device is deployed (e.g., each source and output device and the associated command signals), input ports for receiving signals from the source devices, an internal switch for making the connections between the output device(s) and source devices through their respective ports, and a processor to interpret the data stored within the memory and control to the internal switch.

In some embodiments, a connected media system may comprise an output device (e.g., television, projection screen, or audio platform) as well as an input selection subsystem, which may be integrated into the output device. The connected media system may receive source signals from multiple source devices that may provide content for presentation at the output device. In accordance with this disclosure, the input selection subsystem may receive the source signals from the source devices as well as command signals for controlling the source devices. The input selection subsystem may store the command signals for each of the source devices in memory and may be able to send to the output device the source signal of the source device to which a received command signal is directed.

The command signals need not explicitly specify that content from a particular source device should be displayed; instead, a given command signal may direct a source device to perform a particular action. The input selection subsystem may automatically select the associated source content for presentation by extrapolating user intent (e.g., that they want to watch content from a given source device) based on the detection of the command signal intended to control a particular source device.

BRIEF DESCRIPTION OF THE DRAWINGS

Figures, aspects and embodiments of the disclosure are described in conjunction with the attached drawings, in which:

FIG. 5 illustrates an exemplary table containing information that an input selection device may use to detect new source devices that are added to a connected media network;

FIG. 8 is a flowchart illustrating a process by which an input selection device can match source devices to input ports.

These exemplary figures and embodiments are to provide a written, detailed description of the subject matter of any claims that issue from the present application. These figures and embodiments should not be used to limit the scope of any such claim.

DETAILED DESCRIPTION

Figure 1:
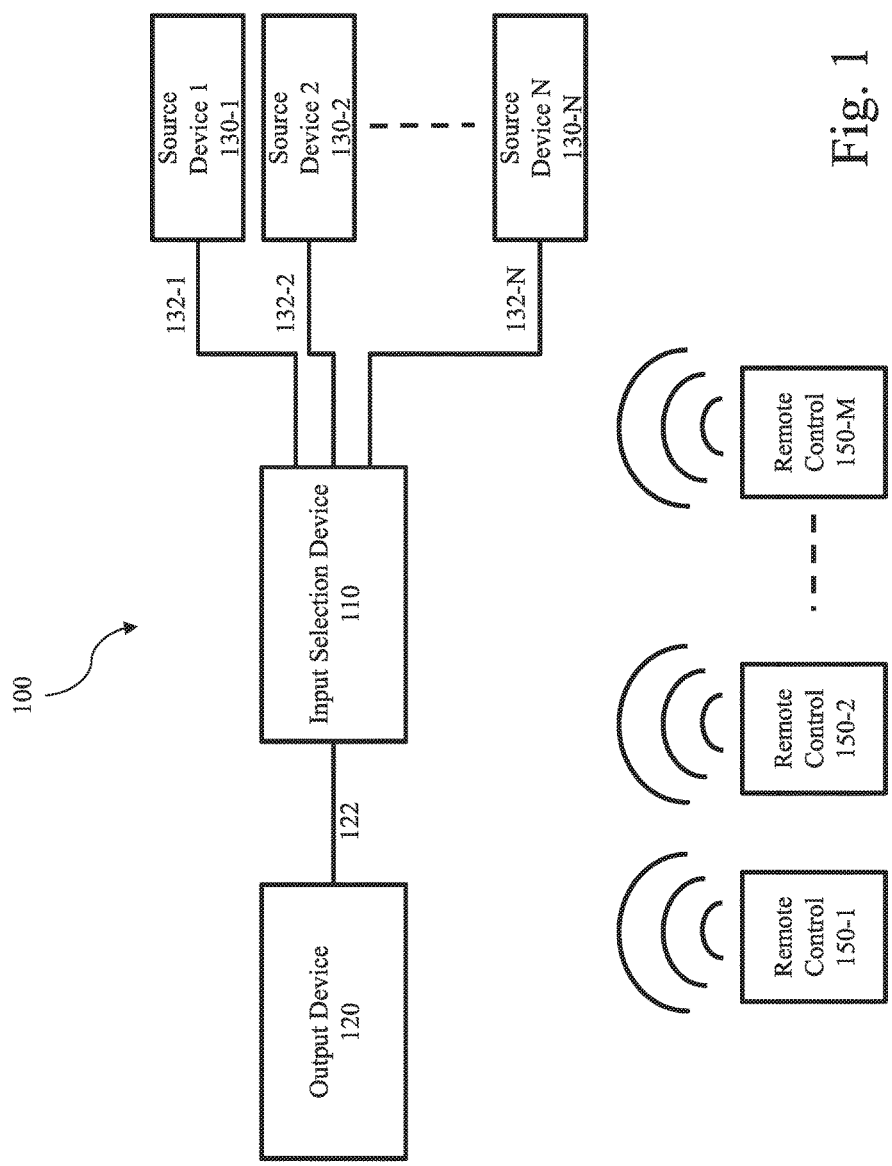
FIG. 1 is a schematic diagram illustrating a connected media network that includes a discrete input selection device in accordance with the disclosed principles.

FIG. 1 is a schematic diagram illustrating a connected media network 100 that includes a discrete input selection device 110 in accordance with the disclosed principles. The connected media network 100 may, for example, be a home theater system for presenting audiovisual content as well as interactive gaming content to a user.

As shown in FIG. 1, the connected media network 100 may comprise the input selection device 110, an output device 120, a plurality of source devices 130-1 to 130-N, and a plurality of remote controls 150-1 to 150-M. In some embodiments, the output device 120 is a video-capable system such as a liquid-crystal display (LCD) television or a projector coupled with a projection screen and an accompanying sound system. In other embodiments, the connected media network 100 is designed to present audio content through the output device 120, which may be a sound system having one or more speakers, subwoofers, and other audio output devices.

The input selection device 110 may be a discrete device configured to receive signals bearing media content from each of the source devices 130 and choose one such signal to be provided via a connection 122 to the output device 120 at a given time for presentation to the user. The input selection device 110 may be implemented as described below with respect to FIG. 4.

In accordance with the disclosed principles, the input selection device 110 may listen for signals from the remote controls 150 as well as via the connections 132-1 to 132-N between the input selection device 110 and the source devices 130-1 to 130-N. When a user decides, for example, to view or interact with content on source device 130-1, the user may desire to bypass the manual input selection process and instead select a command (e.g. "play," "fast forward," or "device on") to interact with the source device 130-1. In accordance with the disclosed principles, the input selection device 110 may detect the command signal, via the connection 132-1 or through the remote control 150-1 associated with the commanded source device 130-1. Upon or following such detection, the input selection device 110 may connect the source device 130-1 to the output device 120 for presentation of the selected content. This automatic switching process may be independent of the existing system state of the output device 120 (e.g., what source device 130 is already selected for presentation on the output device 120).

In some embodiments, the input selection device 110 may, in response to receiving a command signal from a remote control 150 (e.g., "play" or "fast forward"), power on or wake up the source device 130 that the input selection device 110 recognizes as being associated with the command signal.

The principles of the present disclosure beneficially save the user from separately selecting the input source for the output device 120 when the output device 120 is not already providing content from the desired source device 130. While this would generally save time and decrease the number of steps the user must make, the system is particularly helpful in scenarios where the user must find the remote control 150 associated with the output device 120 solely to switch the input of the output device 120.

The connections 132-1 to 132-N as well as the communication channels used by the remote controls 150 may be implemented over any medium of communication using any technology, including infrared, radio, internet protocol, optical or electrical cabling, or even audio (e.g., an audio transmission line and voice recognition at the receiving end point). The input selection device 110 may listen over the same media of communication that connect the remote controls 150 to the source devices 130 to detect command signals, as will be described in further detail below. In some embodiments, the remote controls 150 may be nodes within a local network and the input selection device may search for and detect command signals by inspecting packets within the local network.

Figure 2:
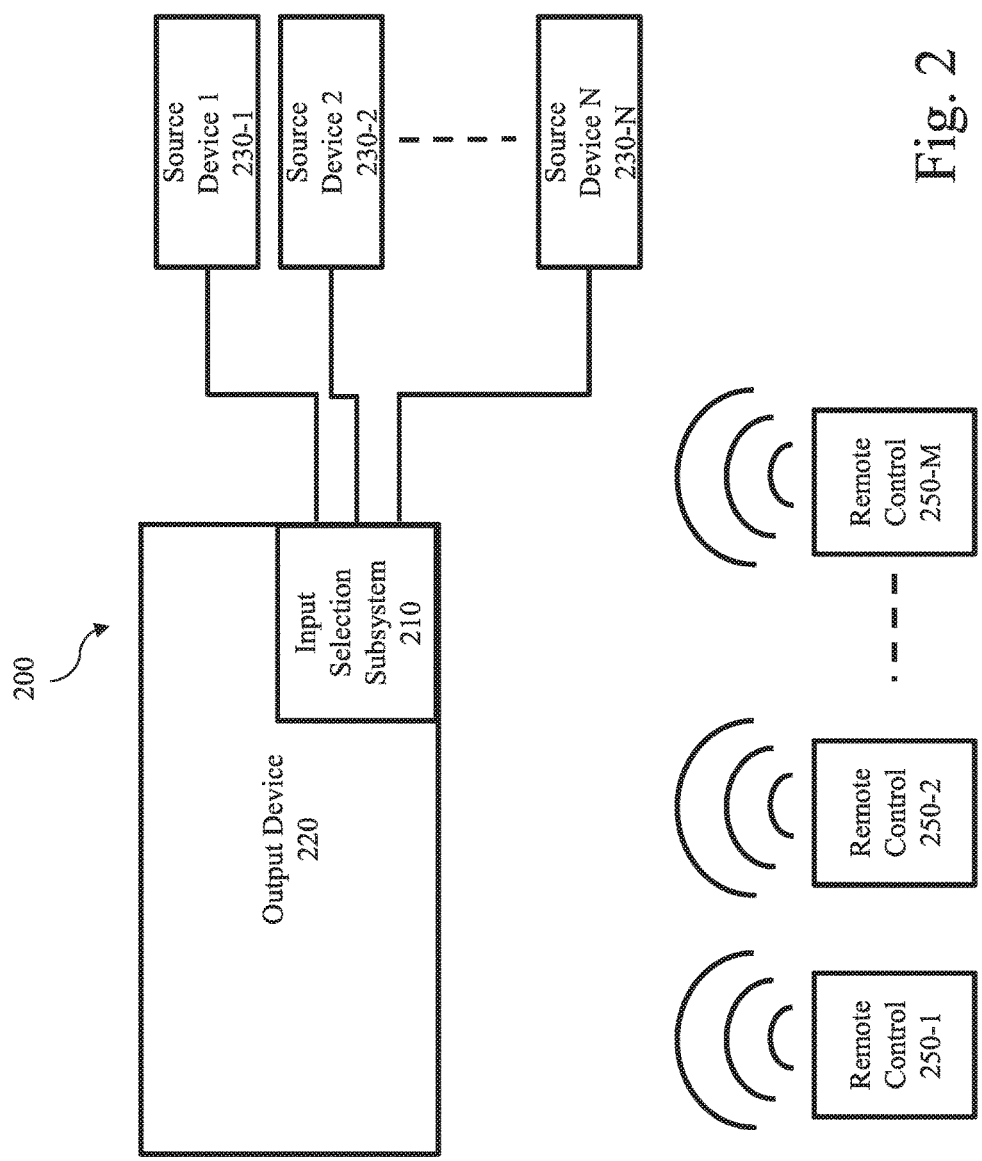
FIG. 2 is a schematic diagram illustrating a connected media network wherein an input selection subsystem is integrated into an output device.

FIG. 2 is a schematic diagram illustrating a connected media network 200 wherein an input selection subsystem 210 is integrated into an output device 220 (together a connected media system). The connected media network 200 may also comprise a plurality of source devices 230-1 to 230-N and a plurality of remote controls 250-1 to 250-M.

The input selection subsystem 210 may be configured to provide the same features as the input selection device 110 described with respect to FIG. 1. Therefore, the terms "input selection subsystem" and "input selection device" will be used interchangeably throughout this disclosure.

This topology allows manufacturers of output devices (e.g., televisions) to incorporate the features of the input selection device into the output devices themselves, thereby potentially decreasing system setup complexity and the number of devices necessary within the home to enable the disclosed techniques. The connections between the remote controls 250, the source devices 230, and the output device 220 (through the input selection subsystem 210) may be implemented over any medium of communication using any technology, including infrared, radio, internet protocol, optical or electrical cabling, or even audio.

Figure 3:
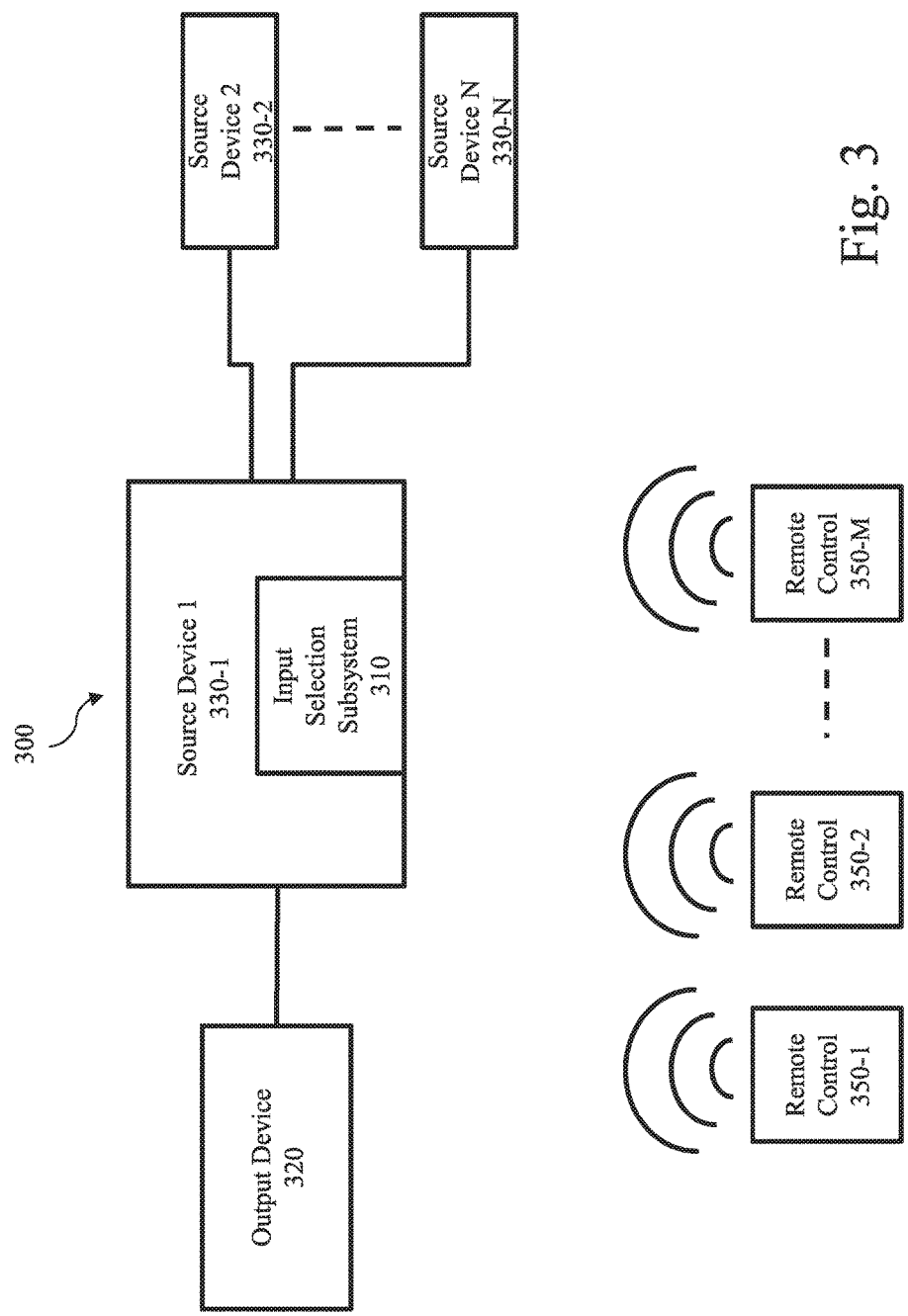
FIG. 3 is a schematic diagram illustrating a connected media network in which an input selection subsystem is integrated into a source device.

FIG. 3 is a schematic diagram illustrating a connected media network 300 wherein an input selection subsystem 310 is integrated into a source device 330-1. The source device 330-1 is one among a plurality of source devices 330-1 to 330-N. The input selection subsystem 310 may be configured to provide the same features and the input selection device 110 described with respect to FIG. 1. The connected media network 300 may also comprise an output device 320 and a plurality of remote controls 350-1 to 350-M. Such a topology may be used when, for example, the source device 330-1 is a set-top box connected directly to an output device 320 and each of the other source devices 330-2 to 330-N is routed to the output device 320 through the source device 330-1. The connections between the remote controls 350, the source devices 330, and the output device 320 may be implemented over any medium of communication using any technology, including infrared, radio, internet protocol, optical or electrical cabling, or even audio.

While FIGS. 1-3 each show multiple remote controls, the disclosed principles may also be implemented in systems having a single universal remote control capable of controlling both the output device as well as each of the source devices. As the signals being sent by the universal remote control are intended to recreate those sent by the individual remote controls initially paired with the source devices, the input selection device may nonetheless detect source identifying information, thereby allowing the input selection device to select the correct input source in accordance with the disclosed principles.

Further, while a single output device is shown in FIGS. 1-3, a connected media network may comprise multiple output devices. In such embodiments, the input selection device may maintain state information indicating an active output device to which media content from the selected source device may be routed. The input selection device may determine the active output device based on the most recent output device command signal received, thereby not requiring the user to specify at which output device content from a source device should be presented.

Figure 4:
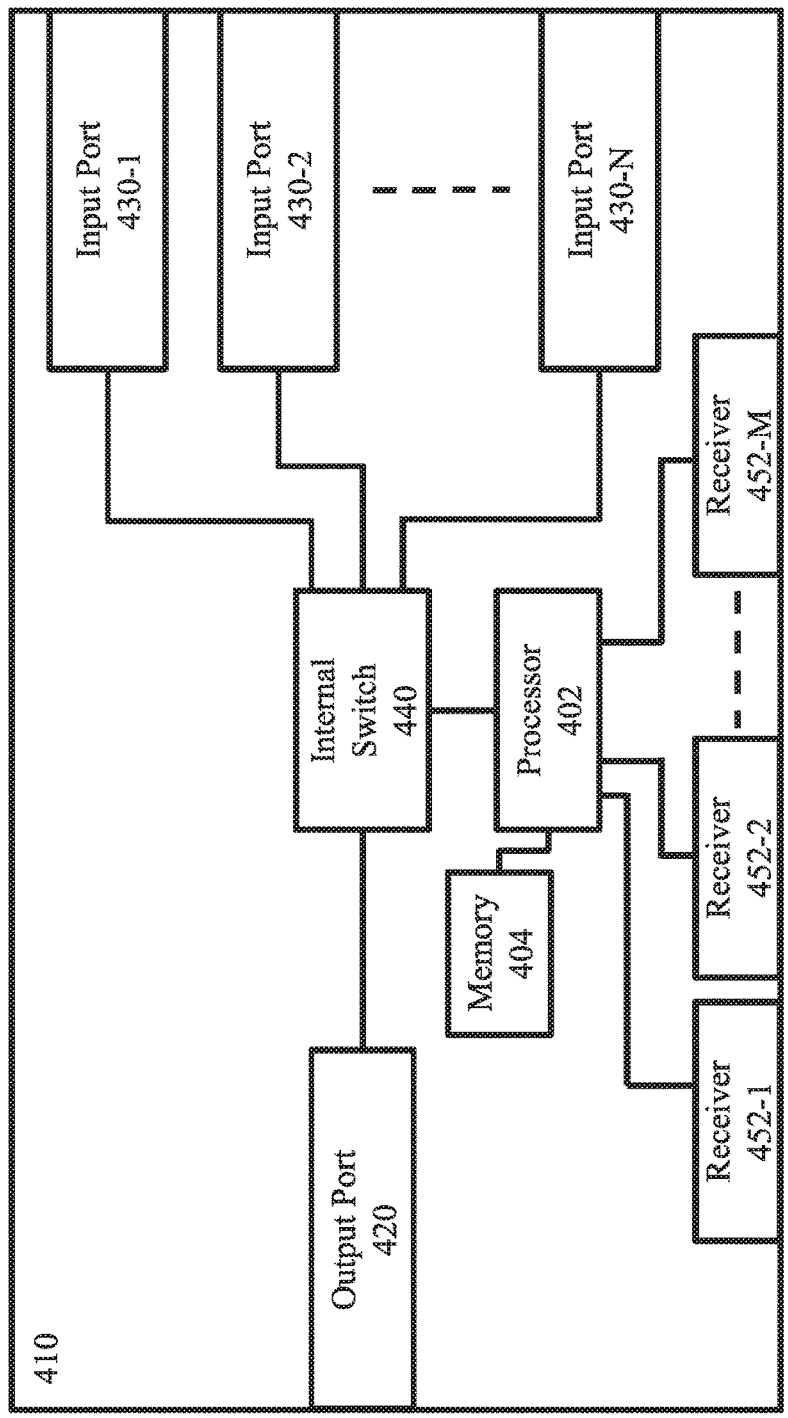
FIG. 4 is a schematic diagram illustrating the composition of an input selection device in accordance with the present disclosure.

FIG. 4 is a schematic diagram illustrating the composition of an input selection device 410 in accordance with the present disclosure. The input selection device 410 may comprise a processor 402, a memory device 404, an output port 420, input ports 430-1 to 430-N, an internal switch 440, and receivers 452-1 to 452-M.

The input ports 430-1 to 430-N may be used to connect to the source devices within a connected media network and receive source signals (e.g., those carrying media content) from the source devices. The output port 420 may be used to provide one of the received source signals to an output device. The actual connection of a given input port 430 to the output port 420, as well as any requisite format conversion may be handled by the internal switch 440.

As previously described, the input selection device 410 may be configured to receive signals from a plurality of remote controls, and may therefore comprise the multiple receivers 452, which may be connected to or listen on each of the communication media used within the input selection device's connected media network, including infrared, radio, internet protocol, optical or electrical cabling, or even audio.

The processor 402 may be configured to execute the code embodied on the memory device 404 to control the input selection device 410 in accordance with the disclosed principles. The processor 402 may analyze the signals provided from the input ports 430-1 to 430-N to determine whether the received source signals have discontinuities, as will be discussed further below. In some embodiments, the input selection device 410 may include a specialized video processor to perform this analysis.

In addition to holding executable code for the processor 402, the memory device 404 may contain (i) a table to assist in the detection of new source devices within the connected media network and (ii) a local table with the already-detected source devices and associated command signals. The two tables will be discussed further below in the descriptions corresponding to FIGS. 5 and 6.

FIG. 5 illustrates an exemplary table 500 containing information that an input selection device may use to detect new source devices that are added to a connected media network. The table 500 may have a row entry for each individual device that may be detected as well as additional information associated with each device, organized through a series of columns. As shown in FIG. 5, the stored data may include a device type 510, a device manufacturer 520, a device model identifier 530, and a list of command signals 540. The device model identifier 530 may be unique to a particular model of device, which may be sufficient when homes do not contain more than one instance of a particular device model. However, the table 500 may also comprise a column for globally unique device identifiers, as may be useful where multiple instances of a certain device model are likely to be found within the same network.

The command signals 540 represent detectable signals associated with a particular source device. The signals themselves may have device identifying information as well as instructions for the device to take a particular action such as playing content, switching channels, turning on the device, or other functionality depending on the nature of the device. The command signals 540 may be expressed over any medium of communication, including infrared, radio, internet protocol, optical or electrical cabling, or audio (e.g., voice recognition).

The input selection device may use the table 500 to match a detected command signal to a particular model of device (or unique instance of a device) that is within a connected media network. For example, upon detecting an infrared "play" command for a particular model of Blu-ray player, the input selection device may determine that an instance of that Blu-ray player is present within the connected media network. Upon doing so, it may enter that device into a local table as discussed below with respect to FIG. 6.

Figure 6:
FIG. 6 illustrates an exemplary local table containing information about source devices within a connected media network.

FIG. 6 illustrates an exemplary local table 600 containing information about source devices within a connected media network. An input selection device may store the information shown in the local table 600 within memory and may use this information to determine which particular source devices are connected within a connected media network and how each source device is connected (e.g., what input port each source device is using at the moment). The local table 600 may have a row entry for each input port (demarcated in column 610) within the connected media network as well as information on any source devices that are determined to be connected to each such input port, organized through a series of columns. The specific source devices may be listed by device type 620, device manufacturer 630, and device model identifier 640. In some embodiments, the source devices, as expressed through columns 620, 630, and 640, may be a small subset of those provided in the table 500 of FIG. 5; that is, the source devices in local table 600 may only include those devices that are determined to be within a particular connected media network. Further, the local table 600 also contain a column for globally unique device identifiers where multiple instances of a certain device model are likely to be found within the same connected media network.

The table 600 may also contain a list of command signals 650 for each row, much like the codes 540 described with respect to FIG. 5, However, unlike the command signals 540 with respect to FIG. 5, the command signals 650 in the local table 600 represent only the command signals that trigger the input selection device to switch to inputs. In some embodiments, the input selection device may recognize only a subset of the total possible commands of each source device as triggering the automatic input switching. This subset of commands may be those that a user would be most likely to input when they begin interacting with the connected media network in a given session. That is, the command signals 650 within local table 600 may reflect actual usage patterns and minimize the likelihood of unintentional input switching. In other embodiments, the local table 600 may include all command signals associated with each detected source device.

Various techniques may be used to populate the local table 600. For example, the input selection device may automatically detect the source devices connected to it by receiving data over the connections between the input selection device and the source devices. That is, a source device may send device identifying information to the input selection device so that the input selection device is able to populate one row in the table 600.

In some embodiments, the table 600 may be generated, in whole or in part, when the user power cycles devices (including taking devices into and out of standby mode). The input selection device may detect a power command directed to a known type of source device. It may then analyze the various input ports to look for a discontinuity in the source signal likely to occur based on a power cycling device, such as the sudden appearance or disappearance of video data from the source signal. The types of discontinuities may be dependent on the type of source device and input connection, and methods for determining such discontinuities are known to one of ordinary skill in the art. The input selection device may then assign, within memory, the source device to the input port with the detected discontinuity. This method is described in further detail in FIG. 8.

In the case of internet-connected source devices such as those controllable via IP packets received from other devices, the input selection device may listen on the local network (e.g., a Wi-Fi network provided by a wireless router) for traffic associated with the internet-connected source devices. This could involve deep packet inspection to determine whether known "play" commands or other command signals are embedded within the messages or by simply recognizing the IP address of a newly installed internet-connected source device and detecting subsequent traffic to that IP address.

The table 600 may also be generated, in whole or in part, based on manual user input. Users may indicate to an input selection device when a particular source device is connected to an input port, resulting in an update to that input port's row within the table 600. This manual indication may occur through a graphical interface generated by the input selection device and displayed on the output device. Such manual capabilities are beneficial for legacy devices and others (e.g., devices not compatible with the HDMI standard) that cannot convey identifying information via their connections to downstream devices (e.g., the input selection device or an output device).

Figure 7:
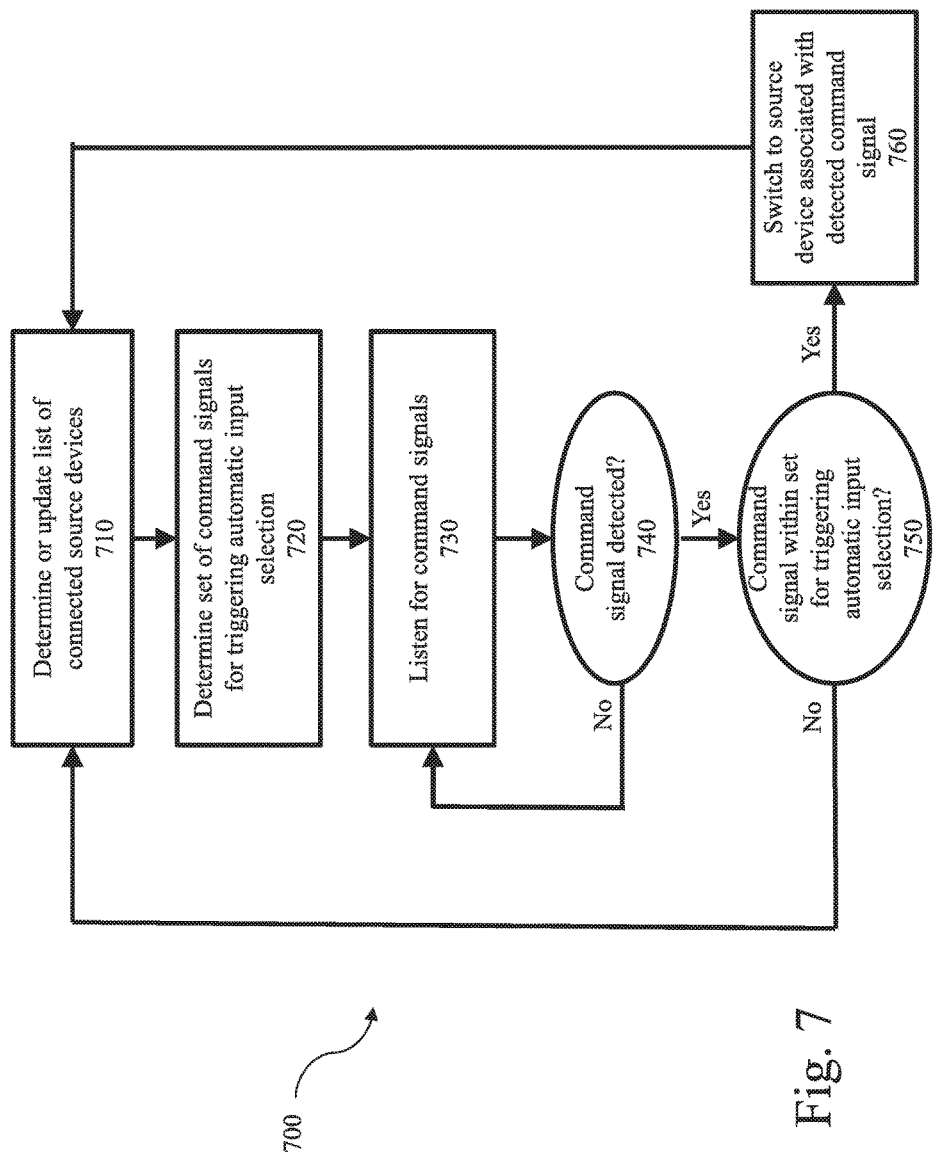
FIG. 7 is a flowchart illustrating a process by which an input selection device can automatically switch inputs based on a detected command signal.

FIG. 7 is a flowchart illustrating a process 700 by which an input selection device can automatically switch inputs based on a detected command signal.

The process begins at action 710, where the input selection device detects each of the source devices connected within its connected media network. This action may occur through querying the input ports (e.g., of the input selection device itself or the source device or output device within which the input selection device is incorporated) or through any of the other techniques described herein. Upon completion of the detection process, the input selection device may store a device list within the input selection device's memory in a data structure resembling that shown in FIG. 6, though the precise types of data stored may vary—provided there is sufficient device identifying information.

At action 720, the input selection device determines the set of command signals that, if detected, would result in the input selection device switching input channels such that an output device within the connected media network would display content from the source device associated with the command signal. This set of command signals may be a subset of the total command signals available to each source device that are most likely to indicate that a user wishes to view or otherwise consume content from that source device. Each command signal may be included in the data structure associated with action 710 and paired with (e.g., within the same row as) a connected source device.

At action 730, the input selection device listens for command signals. This process may occur over any and all channels of communication, including infrared, radio, internet protocol, optical or electrical cabling, or audio (e.g., voice recognition). Further, the input selection device may listen to a broader set of command signals than those within its local table to enable the detection of new source devices.

At decision point 740, the input selection device determines whether or not it detected a command signal. If so, the process 700 continues to decision point 750. If not, the process 700 returns to action 730.

At decision point 750, the input selection device determines whether or not the detected command signal is within the set of commands for triggering automatic input selection. For example, the input selection device may check the data structure of actions 710 and 730 to determine whether the detected command signal is within it. If the detected command signal is within the set, the process 700 proceeds to action 760. If not, the process 700 returns to action 710, where the newly detected command signal may be used to determine whether a new source device is connected within the connected media network.

At action 760, the input selection device connects the source device associated with the triggering command signal (e.g., the device intended to be controlled by the triggering command signal) to the output device, such that a source signal from that source device is provided to the output device for presentation. Additionally, the input selection device may query the operating state of the source device and send a "wake up" signal if the source device is determined to be asleep or powered off.

It is noted that the process 700 is iterative, such that the input selection device maintains an up-to-date source device list and is constantly listening for the opportunity to automatically change inputs based on the user's implicit demands.

FIG. 8 is a flowchart illustrating a process 800 by which an input selection device can match source devices to input ports. This may be helpful, for example, when populating or updating a local table of source devices as described with respect to FIG. 6 or in action 710 of FIG. 7.

The process 800 begins at action 810, where the input selection device receives a signal indicating that a source device will change state. This signal may be received over any medium of communication, including infrared, radio, internet protocol, optical or electrical cabling, or audio (e.g., voice recognition).

At action 820, the input selection device listens to each input port to find a discontinuity in the source signals associated with each input port. The input selection device may listen for a short period of time (e.g., 10 milliseconds, 100 milliseconds, 500 milliseconds, 1 second, or 3 seconds) in search of the discontinuity as a discontinuity occurring after such a time is likely unassociated with the signal indicating that the source device will change state.

At action 830, the input selection device assigns the source device associated with the received signal to the input port at which the discontinuity was found. This assignment may occur by updating the row for the input port in the local table (as described in FIG. 6) with information about the detected source device.

While the processes 700 and 800 are described with respect to the input selection device, which convey certain benefits (e.g., centralized control), one could implement one or more of the actions and decision points shown in FIGS. 7 and 8 on other devices or platforms.

What is claimed is:

1. An input selection device for selecting one of a first source signal from a first source device and a second source signal from a second source device, respectively, for presentation at an output device, the input selection device comprising:
   a receiver configured to detect a first command signal for controlling the first source device;
   a memory device configured to store a command signal list;
   a first input port configured to receive the first source signal from the first source device;
   an output port;
   an internal switch configured to select one of the first input port and the second input port for connection to the output port; and
   a processor operably connected to the memory, the internal switch, and the receiver, the processor configured to direct the internal switch to connect the first input port to the output port when the receiver detects the first command signal,
      wherein the processor is further configured, in response to the receiver's detection of the first command signal, to listen on the first input port in search of a discontinuity in the first source signal; and
      wherein the processor is further configured to assign the first source device to the first input port in the command signal list if there is a discontinuity detected in the first source signal received at the first input port.

2. The input selection device of claim 1, wherein the command signal list comprises a local table that associates the first source device with both the first input port and the first command signal.

3. The input selection device of claim 2, wherein the command signal list stores the first source device using at least one of a device model identifier, a device manufacturer, and a device type.

4. The input selection device of claim 1, further comprising
a second input port configured to receive the second source signal from the second source device;
wherein the memory device is further configured to store a second command signal for controlling the second source device in the command signal list; and
wherein the processor is further configured to direct the internal switch to connect the second input port to the output port when the receiver detects the second command signal.

5. The input selection device of claim 1, wherein the command signal list comprises a local table that associates a plurality of command signals for controlling the first source device with at least one of the first source device and the first input port, the plurality of command signals including the first command signal.

6. The input selection device of claim 5, wherein the plurality of command signals is a subset of all signals for controlling the first source device.

7. The input selection device of claim 1, wherein the receiver is configured to detect the first command signal on a communication medium that uses at least one of infrared transmission, radio transmission, internet protocol, optical cabling, electrical cabling, and an audio transmission line.

8. A connected media system for presenting one of a first source signal from a first source device and second source signal from second source device, the connected media system comprising:
an output device configured to present the first source signal and the second source signal; and
an input selection subsystem configured to receive the first source signal from the first source device and the second source signal from the second source device, the input selection subsystem comprising:
a first input port configured to receive the first source signal from the first source device;
a memory device configured to store a command signal list; and
a processor configured, in response to the input selection subsystem detecting a first command signal for controlling the first source device, to listen on the first input port in search of a discontinuity in the first source signal;
wherein the processor is further configured to assign the first source device to the first input port in the command signal list if there is a discontinuity detected in the first source signal received at the first input port;
wherein the input selection subsystem is further configured to send the first source signal from the first input port to the output device for presentation following detection of the first command signal.

9. The connected media system of claim 8, wherein the input selection subsystem is integrated into the output device.

10. The connected media system of claim 8, wherein the command signal list comprises a local table that associates a plurality of command signals for controlling the first source device with at least one of the first source device and the first input port, the plurality of command signals including the first command signal.

11. The connected media system of claim 10, wherein the plurality of command signals is a subset of all signals for controlling the first source device.

12. The connected media system of claim 8, wherein the input selection subsystem determines an operating state of the first source device and sends a wake up signal to the first source device if the first source device is determined to be powered off or in a sleep mode.

13. A method for selecting inputs, the method comprising:
detecting a plurality of source devices including a first source device and a second source device;
constructing a command signal list comprising a first command signal for controlling the first source device, wherein the constructing of the command signal list is accomplished, at least in part, by:
receiving the first command signal;
listening on a first input port in search of a discontinuity in a signal received at the first input port; and
assigning the first source device to the first input port in the command signal list if there is a discontinuity detected in the signal received at the first input port; and
directing an output device to present a source signal from the first source device after detection of the first command signal.

14. The method of claim 13, wherein the constructing of the command signal list is accomplished, at least in part, by:
receiving source identifying information for the first source device via a first input port; and
associating the first source device with the first input port in the command signal list.

15. The method of claim 13, further comprising:
querying an operating state of the first source device; and
sending a wake up signal to the first source device if the first source device is determined to be powered off or in a sleep mode.

16. The method of claim 13, further comprising:
storing a plurality of command signals for controlling the first source device in the command signal list, the plurality of command signals including the first command signal.

17. The method of claim 16, wherein the plurality of command signals is a subset of all signals for controlling the first source device.

* * * * *